Figure 1:
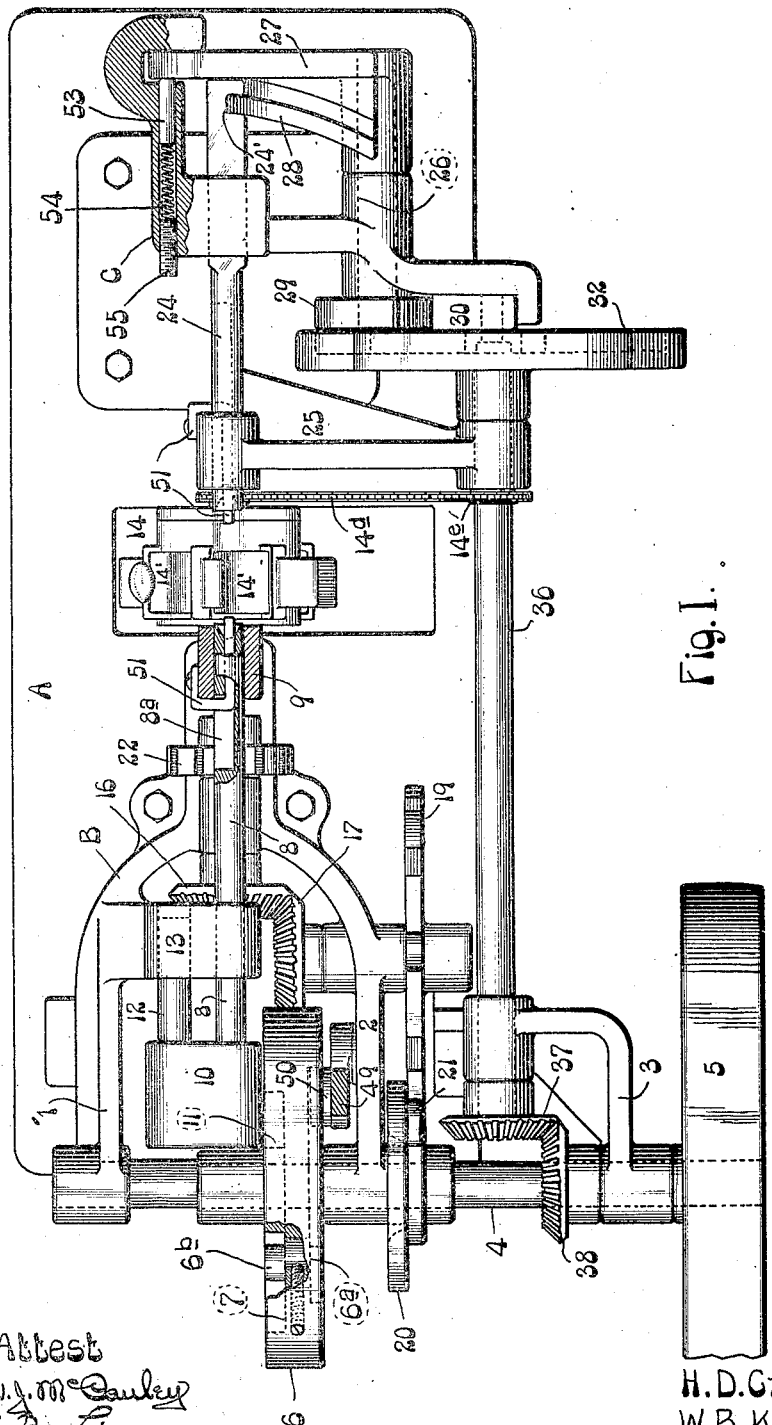

H. D. CRAWFORD & W. B. KNIGHT.
NUT CRACKING MACHINE.
APPLICATION FILED JUNE 19, 1911.

1,037,598.

Patented Sept. 3, 1912.
4 SHEETS—SHEET 1.

Attest
A. J. McCauley
E. B. ____

Inventors
H. D. Crawford
W. B. Knight
by Knight & Cook Att'ys.

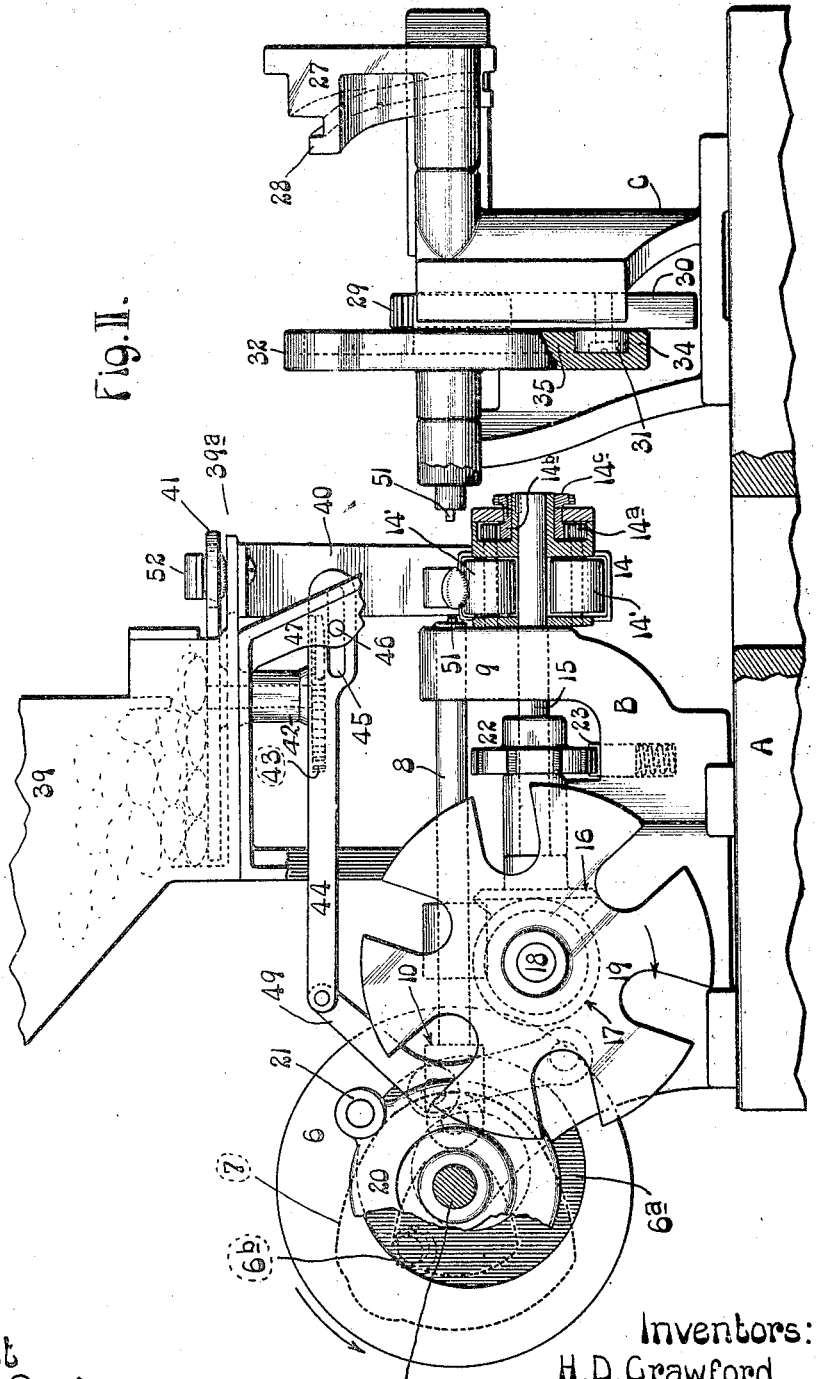

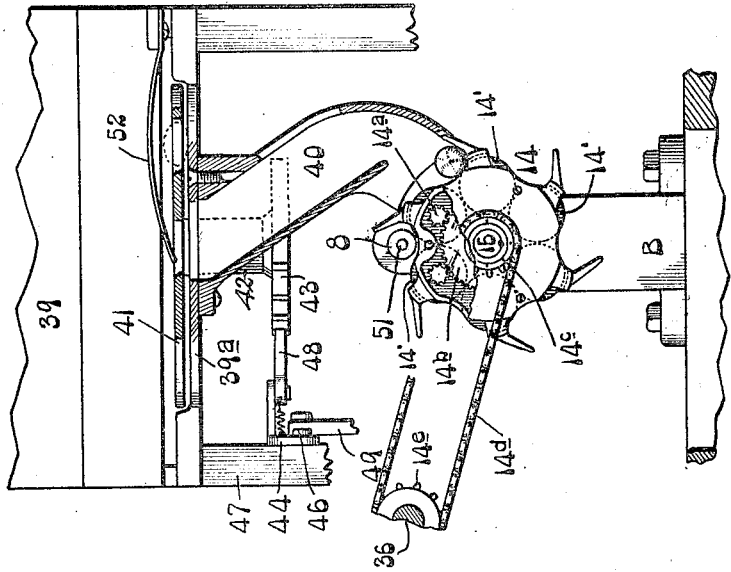

H. D. CRAWFORD & W. B. KNIGHT.
NUT CRACKING MACHINE.
APPLICATION FILED JUNE 19, 1911.
1,037,598.
Patented Sept. 3, 1912.
4 SHEETS—SHEET 4.
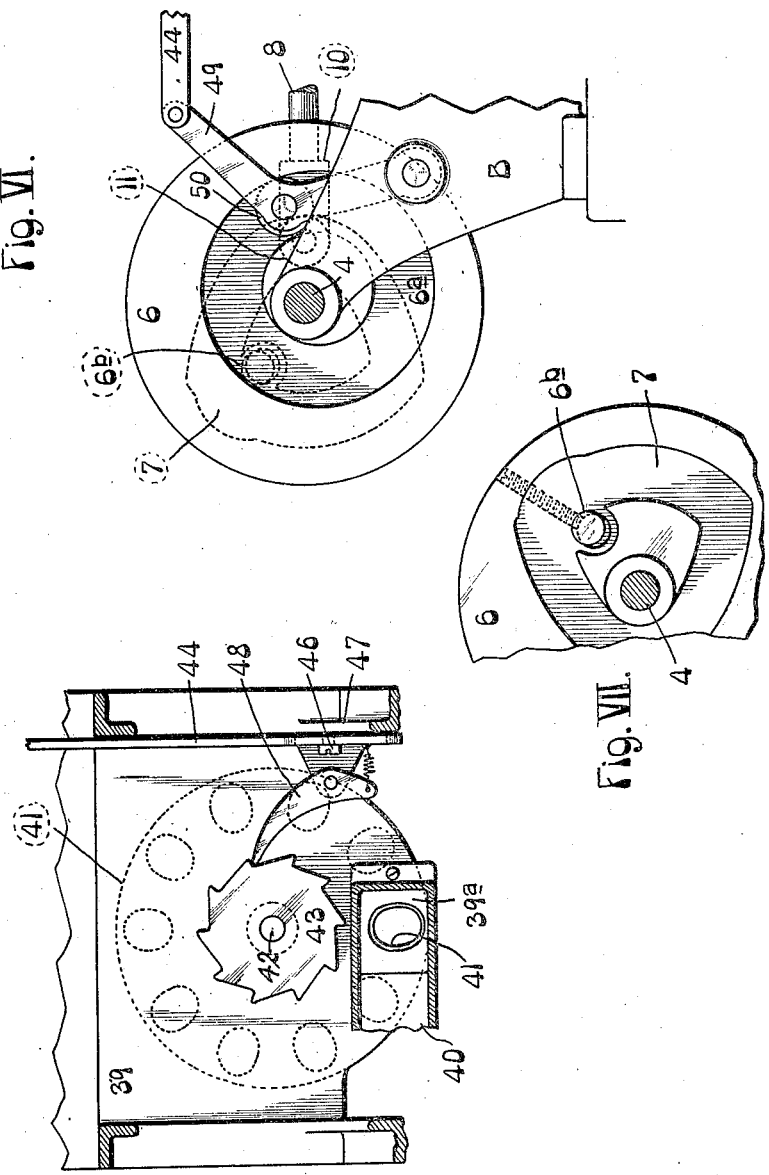
Attest
A. J. McCauley
E. B. Lunz
Inventors:
H. D. Crawford
W. B. Knight
by Knight & Cook
Attys.

UNITED STATES PATENT OFFICE.

HENRY D. CRAWFORD AND WILLIAM B. KNIGHT, OF ST. LOUIS, MISSOURI, ASSIGNORS TO R. E. FUNSTEN DRIED FRUIT & NUT COMPANY, OF ST. LOUIS, MISSOURI, A CORPORATION.

NUT-CRACKING MACHINE.

1,037,598.   Specification of Letters Patent.   Patented Sept. 3, 1912.

Application filed June 19, 1911.  Serial No. 634,091.

*To all whom it may concern:*

Be it known that we, HENRY D. CRAWFORD and WILLIAM B. KNIGHT, citizens of the United States of America, residing at St. Louis, in the State of Missouri, have invented certain new and useful Improvements in Nut-Cracking Machines, of which the following is a full, clear, and exact description, reference being had to the accompanying drawings, forming part of this specification.

Our invention relates to a machine for cracking edible nuts, such for instance as pecans, the invention having for its object the production of a machine of this kind that is of simple and durable structure and in the use of which the nuts may be accurately adjusted between and in engagement with the cracking members irrespective of their lengths, to provide for the cracking operation without injury to the meat in the nuts.

Figure I is a top plan view of our machine with certain parts in horizontal section. Fig. II is in part a side elevation and in part a vertical longitudinal section of the machine. Fig. III is a front elevation of the self-adjusting device for controlling one of the jaw rods and the nut feeding device. Fig. IV is in part an elevation and in part a vertical section of the nut feeding device. Fig. V is an inverted plan view showing the bottom of the hopper of the machine and the means for actuating the feed plate operable in said hopper. Fig. VI is an elevation of the rocker arm of the feed plate actuating device and the cam by which this rocker arm is operated. Fig. VII is an elevation of the cam shown in Fig. VI, looking at its reverse side.

In the accompanying drawings: A designates the bed of our machine upon the rear portion of which is mounted a frame B. The frame B comprises arms 1, 2 and 3 provided with bearing boxes in which the main drive shaft 4 is journaled. The main drive shaft is provided with a power wheel 5 to which power may be applied in any desirable manner.

6 designates a cam wheel fixed to the main drive shaft 4 and provided at one of its sides with a heart shaped cam runway 7, (see dotted lines Figs. II and VI).

8 is a jaw rod extending longitudinally of the machine and slidably mounted at its forward end in the bearing arm 9 forming a part of the frame B. At the rear end of the jaw rod 8 is a head block 10 provided with an antifriction roller 11, (see dotted lines Figs. I, II and VI), that is operable in the heart shaped cam groove in the cam wheel 6, thereby providing for forward and backward movement of the head block 10 and the jaw rod 8 during each complete rotation of the cam wheel 6. The jaw rod and head block are held from rotation by means of the guide rod 12 carried by the head block and operable in a bearing arm 13 of the frame B in which the jaw rod is also operable. The jaw rod 8 is coöperable with an alining companion jaw rod between which and the first named the nuts are impinged and cracked after the adjustment of the second jaw rod, as will hereinafter be fully explained.

14 designates a pocket wheel located adjacent to the forward end of the jaw rod 8 and rotatable transversely of the machine, this pocket wheel being so supported that the bottoms of the pockets therein are substantially in the same horizontal plane as that occupied by the jaw rod 8, in order that when said rod is moved forwardly, it will engage a nut alined therewith in a pocket of the pocket wheel. The pocket wheel is rotatably supported by a shaft 15 journaled in the frame arm 9 and provided at its rear end with a bevel gear wheel 16 which meshes with a bevel gear wheel 17 carried by a shaft 18 journaled in the arm 2 of the frame B and extending transversely of the machine.

19 is a notched wheel fixed to the shaft 18 and located immediately in front of the main drive shaft 4. The main drive shaft has fixed to it a tappet wheel 20 provided with a stud 21, preferably including an anti-friction roller, and which is operable into the notches in the notched wheel 19 for the purpose of imparting a step by step movement to said notched wheel upon each complete rotation of the main drive shaft.

The construction just described provides for the pocket wheel 14 being moved intermittently in such manner that upon each complete rotation of the main drive shaft said pocket wheel will be rotated sufficiently to bring the next succeeding pocket therein into alinement with the jaw rod 8, in order that a nut in this pocket may be properly positioned to be engaged by the jaw rod. To prevent excessive movement of the pocket wheel each time that it is advanced a step in its rotation, we place upon the shaft 15 a notched detent wheel 22 that is engaged by a spring pressed pawl 23.

It will be appreciated that the described devices for imparting step by step movement to the pocket wheel 14 cause this wheel to be very positively and accurately moved during the continuous operation of the main drive shaft and that there is absolutely no opportunity for false movement or positioning of the pockets of the wheel in alinement with the jaw rod 8.

We will next proceed with the description of the second jaw rod and means by which this jaw rod is operated, and automatically adjusted relative to the jaw rod 8, commensurate with the lengths of the nuts that are to be cracked between the jaw rods.

24 designates the second jaw rod which is located in alinement with the jaw rod 8 and is operable toward the rod 8 into the pockets in the pocket wheel 14. The jaw rod 24 is slidably mounted in an arm 25 forming a part of a frame C mounted on the bed A near its forward end, and said rod has engagement with the frame C of such nature as to prevent rotation thereof. In the jaw rod 24, near its outer end, is a transverse notch 24'.

26 designates a stub shaft journaled in the frame C and extending longitudinally of the machine parallel with the jaw rod 24.

27 is a gravity cam-block fixed to the stub shaft 26, the said block being preferably of sectoral shape, as seen in Fig. III. The cam-block is provided with an inclined fin or feather 28 which extends thereon obliquely or angularly relative to the axis of the cam-block, and also relative to the jaw rod 24, the inclination of the fin being upward and backward. This fin is operable in the notch in the jaw rod 24, and it will be readily understood that, when the cam-block descends from the position in which it is seen in the drawings, the inclined fin will, by coöperation with the jaw rod 24, move said jaw rod rearwardly, and that when the cam-block is elevated it will retract said jaw rod. The cam-block 27 is adapted to descend by gravity in order that it may serve to operate the jaw rod in its rearward movement only by virtue of the weight of the block for a purpose to be hereinafter made clear. It is necessary however, to again elevate the cam-block after each rearward movement and we will next describe the mechanism utilized to elevate said cam-block.

The stub shaft 26 has fixed to it a toothed wheel 29 that meshes with the teeth of a vertically movable rack-bar 30, directed in a guide-way supplied by an upright member of the frame C. At the rear side of the rack-bar 30 is an antifriction roller 31.

32 is a cam-wheel located immediately back of the rack-bar 30 and having a recess in its side that faces the rack-bar. A portion of the recess in said cam wheel furnishes a curved cam-way 33 that is located between a peripheral rim flange 34 and a cam boss 35 surrounded by said recess. The camway 33 occupies only a sector of the cam wheel 32, the remaining sector of the said wheel being so made as to provide a wide space $x$ between the rim 34 and the cam boss 35 and the axis of the wheel that will allow the antifriction roller to move closer to the axis of the cam wheel when the space $x$ is lowermost than it does when the camway 33 is lowermost. The cam wheel 32 is rotatably supported by a shaft 36 journaled in the frame arms 3 and 25 and extending rearwardly into proximity to the main drive shaft 4. The shaft 36 has fixed to it a bevel gear wheel 37 in mesh with a bevel gear wheel 38 fixed to the main drive shaft, thus providing for positive and continuous rotation of the cam wheel 32 during operation of said main drive shaft.

39 designates a hopper from which the nuts are delivered to the pocket wheel 14 through a chute 40 extending downwardly beneath a bottom plate extension 39$^a$ projecting laterally from the hopper and apertured above the chute 40.

41 is a feed plate rotatably mounted in the hopper 39 and projecting to the exterior of the hopper so that it overlies the bottom plate extension 39$^a$. The feed plate is apertured to receive the nuts from the hopper and conduct them therefrom onto the bottom plate extension, in order that they may be delivered through said extension into the chute. The feed plate 41 is provided with a vertical shaft 42 extending downwardly through the bottom plate of the hopper and to which a ratchet wheel 43 is fixed.

44 is a feed plate actuating rod provided with a longitudinal slot 45 that receives a guide pin 46 mounted in a bracket 47 beneath the hopper 39. The actuating rod 44 carries a spring-controlled pawl 48 in engagement with the ratchet wheel 43 by which step by step movements are imparted to the ratchet wheel and the feed plate 41, upon the rearward movements of the actuating rod 44. The feed plate actuating rod is connected at its rear end to one end of a bell crank lever 49, the other end of the bell crank lever being pivoted to the frame B. The bell crank lever 49 is supplied with an antifriction roller 50 located intermediate of its ends, the said roller being operable in a camway 6ª in the cam wheel 6 located at its side opposite to that in which the cam groove 7 is located. The camway 6ª is circular in outline but its wall is eccentric to the axis of the cam wheel 6, thereby providing for the operation of the bell crank lever 49 in a manner to impart reciprocating motion to the feed plate actuating rod.

51 are ejectors fixed to the bearings in which the inner ends of the jaw rods 8 and 24 are guided. These ejectors are extended from the bearings to which they are fastened through slots in the jaw rods, as seen at 8ª, Fig. I. The ejectors are of such length within the jaw rods as to be projected through the jaws at the inner ends of these rods when the rods are retracted, and when so projected, they dislodge any shells that may have become wedged in the jaws.

The nuts to be cracked are placed in the hopper 39, and the main drive shaft 4 having been placed in operation, movement is imparted to the feed plate actuating rod 44 whereby the feed plate is partially rotated to carry a nut in one of the apertures therein along the extension 39ª of the hopper bottom and deposit it into the chute 40 through which it descends into a pocket in the pocket wheel next adjacent to that in alinement with the jaw rods of the machine. It sometimes happens that the nuts become lodged in the apertures in the feed plate and do not fall therefrom of their own weight when they are brought over the chute 40, and to provide for their positive dislodgment, we mount over the feed plate directly above the extension 39ª, a spring finger 52, the free end of which is so disposed as to press against the nuts when the apertures in the feed plate are brought into registration with the chute. The pocket wheel 14 has a step movement imparted to it during the rotation of the main drive shaft, due to the driving connection between said main shaft and the pocket wheel shaft, as previously explained, and the nut that has been deposited in the pocket wheel is therefore, brought at the proper time into alinement with the jaw rods 8 and 24.

It is necessary to provide the pocket wheel 14 of our nut cracking machine with means whereby the nuts deposited in the pockets of the wheel are caused to assume positions parallel with or in alinement with the jaw rods by which they are to be cracked, as otherwise the nuts are liable to become deposited in the pocket wheel in such manner as to lie transversely of or partially transversely of the jaw rods and not receive endwise pressure from the jaw rods, as is necessary for the proper cracking actions. We, therefore provide the pocket wheel with rollers 14', the axes of which extend longitudinally of the pocket wheel, and which are preferably so arranged that there are two rollers at each pocket in the wheel. The spindles of the rollers 14' are equipped with pinions 14ª meshing with a master gear wheel 14ᵇ loosely mounted centrally of the series of pinions 14ª, and by which said pinions are driven to rotate the rollers 14'. The master gear wheel and pinions are preferably located within a gear boxing carried by the pocket wheel 14, and said master gear wheel has fixed to it a sprocket wheel 14ᶜ operable by a drive chain or belt 14ᵈ to which power is transmitted by a sprocket wheel 14ᵉ fixed to the shaft 36. The mechanism described is constantly in action during the operation of our machine and, as a consequence, the rollers 14' are continually rotated to act upon the nuts falling into the pockets of the pocket wheel, whereby said nuts have rolling motion imparted to them and quickly assume positions longitudinally of the wheel and parallel of or in alinement with the jaw rods to be properly presented to the jaw rods at the time they are cracked.

When the pocket wheel 14 has been turned to properly position a nut to be cracked, the jaw rod 8 is advanced into the pocket containing the nut, the advancement being due to the coöperation of the cam wheel 6 with the head block 10 at the rear end of said jaw rod, and during the forward movement of said jaw rod, there occurs also rotation of the shaft 36 positively driven by the main drive shaft and consequent rotation of the cam wheel 32. The rotation of the last mentioned members is so timed relative to the forward movement of the jaw rod 8 that just slightly previous to the completion of the forward stroke of said jaw rod, the recessed portion $x$ of the cam wheel 32 is brought to such position as will permit the departure of the antifriction roller 31 on the rack bar 30 from the camway 33 into said recessed portion $x$ and, as the cam wheel continues to rotate with the recessed portion $x$ lowermost, said antifriction roller is permitted to approach the axis of the cam wheel, thereby allowing gravitated movement of the cam block 27 previously prevented by reason of the engagement of the cam boss 35 with said antifriction roller. The cam block 27 at this time rotates in a downward direction, a movement that is caused wholly by the weight of the block and, as it so moves, its inclined fin 28 acts to move the jaw rod 24 rearwardly toward the jaw rod 8 until it has become impinged against the nut that is to be cracked. This movement into engagement with the nut is accomplished irrespective of the length of the nut and it is obvious that the jaw rod 24 will only be moved a distance that is sufficient to cause the nut to become impinged between the two jaw rods, after which the jaw rod 24 is restrained from backward movement due to the holding effect exerted by the cam block 27. As previously noted, the releasing operation of the cam block 27 occurs previous to the nut fracturing movement of the jaw rod 8, effected by an adjustable pusher 6ᵇ carried by the cam wheel 6, and the impingement of the nut between the two rods is accomplished before the jaw rod 8 has completed its forward stroke. This being true, it will be readily understood that when the nut has been impinged between the two jaw rods ready to be cracked, it may be fractured to just the proper degree when the jaw rod 8 completes its stroke without there being excessive cracking operation to injure the meat of the nut.

The return movement of the jaw rod 8 is accomplished through the medium of the head block 10 and the cam 6, as will be obvious. The return movement of the jaw rod 24 is provided for by reëlevation of the cam block 27, during which its fin operates in the notch in said jaw rod. The reëlevation of the cam block is effected by the cam wheel 32, the rack bar 30, and the toothed wheel 29, the latter of which is associated with the cam block shaft. These parts are brought into operation at the proper time by the entrance of the antifriction roller 31 into the cam way 33 in the cam wheel 32, it being apparent that if said cam wheel rotates, the boss 35 thereof will gradually force the rack bar 30 downwardly and cause it, by coöperation with the toothed wheel 39, to elevate the cam block 27.

Important features in our nut cracking machine upon which no particular stress has hereinbefore been made are that of the bottom plate of the hopper 39 being provided with the extension 39ᵃ jutting outwardly from the hopper, and the apertured feed plate 41 being operable over this extension so that it moves within the hopper to receive nuts therefrom and moves over the extension exterior of the hopper in discharging nuts through the chute 40 to the pocket wheel 14. This construction is important, for the reason that it permits access to the feed plate outside of the hopper, in order that when the apertures in the feed plate become clogged, as they at times do, by nuts of unusual sizes and shapes, these clogging nuts may be readily removed without the necessity of removing the contents of the hopper, as would be necessary if the feed plates operated entirely within the hopper.

The shells of edible nuts vary greatly in thickness and strength, and experience has shown that when the jaws of nut cracking machines are brought into sudden impact against nuts having tender shells, the meat of the nuts is broken and mashed, due to the slight resistance offered by the shells. To overcome this undesired result in the use of our machine, we provide a resistance device, (see Fig. I), by which sudden descent of the cam block 27 is prevented so that it will impart a slow movement to the jaw rod 24. This resistance device comprises a cushioning pin 53 slidable in the frame C, engaging the cam block, the pin being backed by a spring 54 and an adjusting screw 55.

We claim:—

1. In a nut cracking machine, a jaw rod, and a rotatable gravity member for moving said jaw rod, the said gravity member being provided with a jaw rod engaging member extending obliquely relative to its axis.

2. In a nut cracking machine, a jaw rod, and a rotatable gravity member for moving said jaw rod, the said gravity member being provided with a fin extending diagonally relative to its axis, and the jaw rod being provided with a notch in which said fin is operable.

3. In a nut cracking machine, a jaw rod, a gravity member provided with a fin operable in said jaw rod and extending diagonally relative to the axis of the gravity member, and means for reëlevating said cam after it has descended by gravity.

4. In a nut cracking machine, a jaw rod, a gravity member provided with a fin operable in said jaw rod and extending diagonally relative to the axis of the gravity member, means for reëlevating said gravity member after it has descended by gravity; said elevating means comprising a cam wheel, and means connected with said gravity member coöperable with said cam wheel for imparting rotative movement to said gravity member.

5. In a nut cracking machine, a jaw rod, a gravity member provided with a fin operable in said jaw rod and extending diagonally relative to the axis of the gravity member, means for reëlevating said gravity member after it has descended; said last named means comprising a shaft by which said gravity member is carried, a toothed wheel on said shaft, a rack bar in engagement with said toothed wheel, and a cam wheel for operating said rack bar.

6. In a nut cracking machine, a pair of jaw rods, mechanism for moving said jaw rods toward each other, a pocket wheel in which the nuts are presented between said jaw rods, a shaft by which said pocket wheel is carried, and means for operating said shaft, comprising a toothed wheel, and a rotative tappet wheel for driving said toothed wheel.

7. In a nut cracking machine, a nut receiving wheel, the said wheel comprising as component parts thereof a series of rollers by which the nuts may be rotated while carried by the wheel, pinions carried by said rollers, and a master gear wheel by which said pinions are driven to impart rotation to said rollers.

8. In a nut cracking machine, a longitudinally movable jaw rod, a gravity member for moving the said jaw rod, and adjutsable means offering resistance to the movement of said gravity member during the descent thereof.

H. D. CRAWFORD.
W. B. KNIGHT.

In the presence of—
 H. G. COOK,
 E. B. LINN.